United States Patent [19]

Ohkita et al.

[11] Patent Number: 4,796,118
[45] Date of Patent: Jan. 3, 1989

[54] WELDED LEAF SPRING MOUNTING FOR MAGNETIC HEAD ASSEMBLY OF DISK DRIVE APPARATUS

[75] Inventors: Masao Ohkita; Kazuo Kobayashi, both of Furukawa; Kunihiko Gunji, Miyagi; Tadami Sugawara, Furukawa; Osamu Shigenai, Furukawa; Takamichi Fuke, Furukawa, all of Japan

[73] Assignee: Alps Electric Co., Ltd., Japan

[21] Appl. No.: 25,213

[22] Filed: Mar. 12, 1987

[30] Foreign Application Priority Data

Jul. 31, 1986 [JP] Japan .................... 61-178893

[51] Int. Cl.⁴ .................... G11B 5/54; G11B 21/16
[52] U.S. Cl. .................... 360/105
[58] Field of Search ............ 360/86, 97, 99, 103–106, 360/110

[56] References Cited

U.S. PATENT DOCUMENTS

| 4,250,530 | 2/1981 | Yang | 360/105 |
| 4,302,789 | 11/1981 | Vos | 360/105 |
| 4,327,388 | 4/1982 | Wanek | 360/104 |
| 4,355,339 | 10/1982 | King et al. | 360/105 |
| 4,389,688 | 6/1983 | Higashiyama | 360/104 |
| 4,399,476 | 8/1983 | King | 360/104 |
| 4,549,239 | 10/1985 | Kawajiri | 360/105 |

FOREIGN PATENT DOCUMENTS

| 54-133311 | 10/1979 | Japan | 360/110 |
| 58-45660 | 3/1983 | Japan | 360/104 |
| 59-63058 | 4/1984 | Japan | 360/110 |

Primary Examiner—Stuart N. Hecker
Assistant Examiner—Benjamin E. Urcia
Attorney, Agent, or Firm—Guy W. Shoup; Paul J. Winters; Leighton K. Chong

[57] ABSTRACT

There is disclosed a magnetic head assembly for use in a disk drive that can store and retrieve data from a magnetic disk. The assembly has a carriage and an arm on which a lower magnetic head and an upper magnetic head are carried, respectively. A hinged leaf spring is located on the carriage remotely from the heads. The arm can swing about the spring which is welded to the spring mount portion of the carriage.

3 Claims, 2 Drawing Sheets

WELDED LEAF SPRING MOUNTING FOR MAGNETIC HEAD ASSEMBLY OF DISK DRIVE APPARATUS

FIELD OF THE INVENTION

The present invention relates to a magnetic head assembly for use in a disk drive that can store and retrieve data from a magnetic storage medium in the form of a disk.

BACKGROUND OF THE INVENTION

Usually, a magnetic head assembly for storing and retrieving data from a magnetic disk has an openable, hinged side to permit insertion of a magnetic disk. When such a disk is inserted, an arm is swung to its closed position. Then, storing or retrieving of data is allowed. Under this condition, a certain force is applied to one magnetic head to bring the head into sliding cnntact with the disk. The force applied to the head is adjusted by adjusting the force applied from the arm to the carriage, whether the disk is a single- or double-sided recording medium.

One example of such a magnetic head assembly is shown in FIGS. 3 and 4. This assembly comprises a carriage 2 having a lower magnetic head 1 at its front end and an arm 4 having an upper magnetic head 3 that is disposed opposite to the lower head 1. The arm 4 can be swung upwardly by a leaf spring 5 hinged at a location remote from the heads. The arm 4 is mounted to the carriage 2 at the base, indicated by 11, of the carriage 2 remote from the heads, by a screw 13 via a retainer member 12.

In order to bring the magnetic head 3 into sliding contact with a disk 6 with an appropriate force as mentioned above, one end of a tension spring 7 is attached to the arm 4. The other end of the spring 7 is fixed to one end of an adjusting member 8 mounted on the bottom of the carriage 2. The side surface of the adjusting member 8 bears on the tip of a protrusion 9 formed on the bottom of the carriage 2, so that the adjusting member 8 can swing. A male screw 10 is screwed to the other end of the adjusting member 8. Thus, the adjusting member 8 is held to the bottom of the carriage 2. The screw 10 mounted on the upper side of the carriage 2 supports the adjusting member 8 from above it in such a way that the adjusting member can be adjusted. That is, the adjusting member 8 can be swung about the tip of the protrusion 8. Thus, the tension on the spring 7 can be adjusted.

The arm 4 is mounted to the carriage 2 at the position of the base 11 as mentioned above. The position of the arm 4 relative to the disk 6 is determined by the height at which the upper head 3 bears on the lower head 1 and also by the height of the surface of the arm 4 facing the carriage 2 above the carriage, the arm 4 being raised by a protrusion 19 formed on the carriage 2 on the side of the base 11. When the arm 4 is swung upwardly, a portion 30 of the arm 4 that is close to the base 11 bears on the prttrusion 19 on the carriage 1. The arm 4 rotates about this portion 30 through a certain angle, as shown in FIG. 3.

The magnetic head assembly constructed as described above is equipped with the two magnetic heads 1 and 3 which are attached to the carriage 2 and the arm 4, respectively, whereby data can be written to, or read from, both sides of the disk 6. The positions of the gaps in the heads 1 and 3 are accurately adjusted in such a way that the distance between them is 4 tracks when the track density is 48 TPI and 8 tracks when the density is 96 TPI. In this way, the disk 6 can be replaced with the other kind of disk.

One method presently frequently adopted for mounting the arm 4 to the carriage 2 is to tighten the screw 13 via the retainer member 12 while watching the distance between the positions of the gaps in the heads 1 and 3 (in reality, the positions of the cores are used instead) with a microscope.

Another method presently commonly adopted consists in retrieving data from the disk by the use of a disk for adjusting the gap positions and in tightening the screw 13 via the retainer member 12 while adjusting the position of the arm 4, until the obtained output signal reaches a certain level.

In either case, the arm 4 is attached to the carriage 2 with the screw 13. Even if the position of the arm 4 is accurately adjusted relative to the position of the carriage 2, a torque is exerted between the leaf spring 5 and the screw 13 when the screw 13 is tightened. As a result, the spring 5, hence the arm 4, is displaced from the intended position, although slightly. Another problem resides in the fact that after the tightening the stress stored in the carriage 2 and the leaf spring 5 is released, causing a displacement. These problems have deteriorated the manufacturing yield, increasing the cost to manufacture the product.

SUMMARY OF THE INVENTION

In view of the foregoing problems with the prior art techniques, it is an object of the present invention to provide a magnetic head assembly in which the arm is placed accurately relative to the carriage.

The above object is achieved by a magnetic head assembly for use in a disk drive that stores and retrieves data from a both-sided magnetic disk, said assembly comprising: a carriage on which a lower magnetic head is carried; an arm on which an upper magnetic head is carried; and a hinged leaf spring about which the arm can swing, the spring being located remotely from the magnetic heads, the spring being welded to the carriage, whereby the arm is mounted to the carriage.

In assembling the novel assembly constructed as described above, the arm is pressed against the carriage, and the assembly stores or retrieves data from the disk. Under this condition, the distance between the gaps in the upper and lower magnetic heads is adjusted. After the adjustment, the leaf spring is welded to the carriage, using a laser beam, for example. At this time, any force which displaces the position of the leaf spring is not applied to the spring. Therefore, the spring will never deviate from the adjusted position during the welding process. Further, no stress is stored. Hence, it is unlikely that stress is released after the welding to thereby move the spring relative to the carriage.

Where laser beam welding or spot welding is utilized to bond the spring to the carriage, it is necessary that the spring mount portion of the carriage to which the spring is welded be made of a metal. Therefore, when the carriage is molded out of resin, it is necessary to mount a metal sheet on the mount portion before the welding. When the carriage consists of a metal plate, the spring can be directly welded to the carriage.

Other objects and features of the invention will appear in the course of the description thereof which follows.

DETAILED DESCRIPTION OF THE INVENTION

Figure 1:
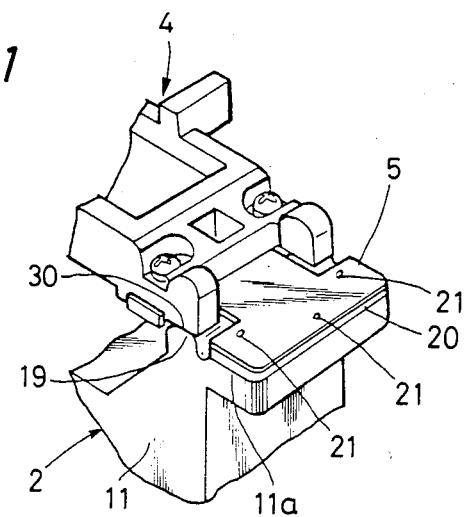
FIG. 1 is a perspective view of main portions of a magnetic head assembly according to the present invention.
Figure 2:
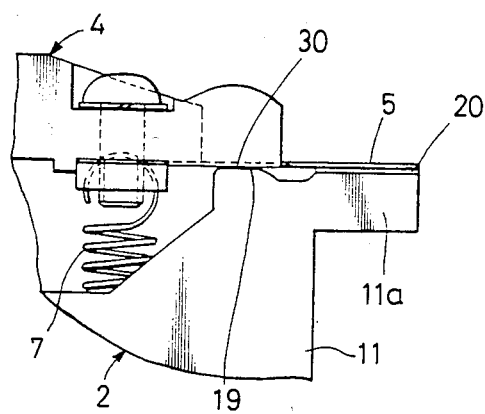
FIG. 2 is a side elevation of main portions of the assembly shown in FIG. 1.
Figure 3:
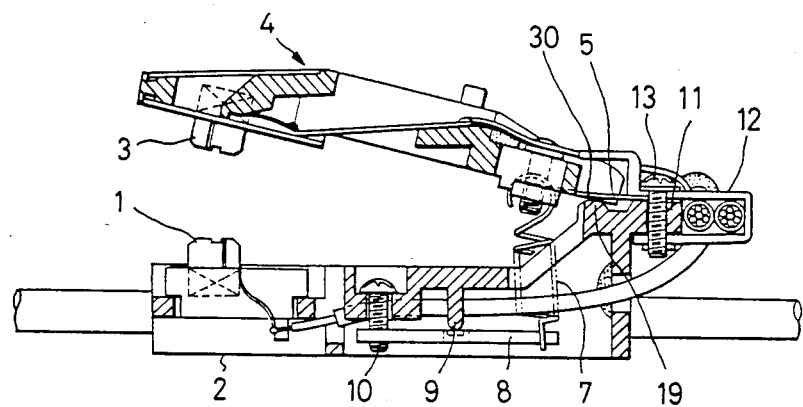
FIG. 3 is a cross-sectional view of a conventional magnetic head assembly, and in which the arm has been raised.
Figure 4:
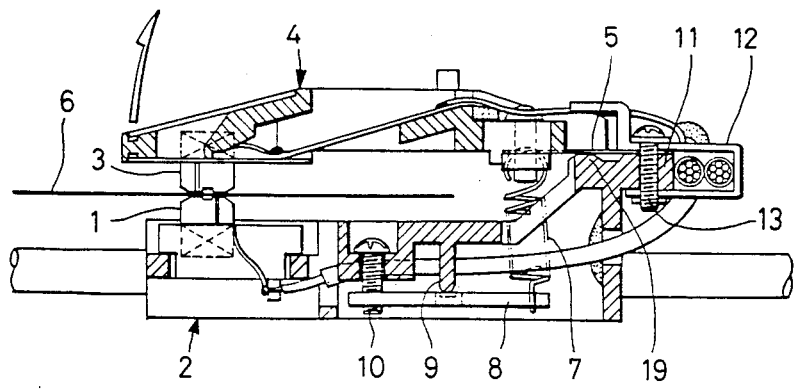
FIG. 4 is a cross-sectional view of the assembly shown in FIG. 3, and in which the arm bears against the carriage.

Referring to FIGS. 1 and 2, there is shown a magnetic head assembly according to the invention. It is to be noted that the like components are denoted by like reference numerals throughout all the figures. The assembly has a carriage 2 made of resin, an arm 4, a tension spring 7, and a hinged leaf spring 5, like the conventional assembly already described. A lower magnetic head (not shown) similar to the lower magnetic head 1 shown in FIGS. 3 and 4 is carried on the carriage 2. An upper magnetic head (not shown) similar to the upper magnetic head 3 shown in FIGS. 3 and 4 is carried on the arm 4. The carriage 2 has a spring mount portion 11a to which the spring 5 is mounted, the mount portion 11a being located on the side of the base 11 of the carriage 2. A sheet 20 made of stainless steel is bonded to the mount portion 11a with resin. The upper surface of the sheet 20 is exposed.

This head assembly is assembled in the manner described below. First, the sheet 20 is bonded to the mount portion 11a of the resinous carriage 2 with resin. The arm 4 is pressed against the carriage 2 so as to apply a certain pressure to the carriage by means of the tension spring 7, as shown in FIG. 2. Under this condition, the distance between the positions of the gaps in the upper and lowe magnetic heads (not shown) is accurately adjusted to 4 or 8 tracks in the manner described above. At this time, the spring 5 is in contact with the upper surface of the sheet 20 without biasing the arm 4. The spring 5 is pressed against the sheet 20 from just above the sheet. Then, the spring 5 is welded to the spring mount portion 11a, using a laser beam. The spring 5 is made of stainless steel and has a thickness of 0.05 mm. The laser beam is emitted by a yag (yttrium-aluminum-garnet) laser in which the active material is neodymium ions. The output of the laser is 2.5 joules. Ten pulses of the laser beam are produced per second. The diameter of the laser spot is 0.3 mm, and the wavelength is 1.6 m. In this example, the spring 5 is welded at three locations 21. The locations 21 and the number of them are appropriately selected, depending on the dimensions of the spring mount portion 11a, the spring 5, and the arm 4, and also on their weight. Also, the aforementioned welding conditions may vary, according to the kind of the metal, the thickness of the sheet, and other factors.

In this example, the carriage 2 is molded out of resin and so the sheet 20 which is made of the same stainless steel as the spring 5 is mounted on the spring mount portion 11a of the carriage 2. Where the carriage 2 is made of a sheet of a metal such as stainless steel, the spring 5 can be directly welded to the metallic carriage 2. Also in the above example, the spring 5 is welded to the spring mount portion, using a laser beam without applying any mechanical force to the spring. The spring may also be bonded to the mount portion by spot welding. Any other welding means may be employed unless a force acting parallel to the surface of the spring 5 is applied to the spring.

As can be understood from the description thus far made, the hinged leaf spring is welded to the carriage. When the spring is mounted, it is unlikely that a force acts on the spring, hence the arm on which the upper magnetic head is carried, thus shifting the relative positions of the gaps in the heads. Consequently, the heads can be mounted at desired positions with minimum error. Thus, the position of the gaps can be adjusted accurately. Further, the carriage and the arm can be mounted easily. In addition, the novel head assemblies can be manufactured with a higher yield than conventional. Hence, the assembly can be fabricated more economically than the conventional assembly.

What is claimed is:

1. In a disk drive apparatus having a horizontally movable carriage provided with a mounting portion on one end thereof and a distal portion on an opposite end thereof on which a lower magnetic head is carried, a pivotable arm having one end pivotally supported on the mounting portion of the carriage and a distal portion on an opposite end thereof on which a upper magnetic head is carried, wherein the arm is pivotable to bring the upper magnetic head on its distal portion opposite the lower magnetic head on the distal portion of the carriage with a predetermined gap spacing therebetween in which a magnetic disk is disposed, and a leaf spring made of metal having one end mounted to the mounting portion of the carriage and another end mounted to the one end of the arm, the improvement wherein said mounting portion of said carriage has an upper metal surface, and wherein said one end of said leaf spring is positioned on said upper metal surface of said mounting portion in a reference position corresponding to said predetermined gap spacing between the magnetic heads, and is welded thereto by welding, said one of said leaf spring being fixedly mounted in said position only by said welding, whereby undesired forces for mounting said leaf spring end of said carriage mounting portion are avoided.

2. The magnetic head assembly of claim 1, wherein said carriage is molded out of resin, and wherein said metal surface is a metal sheet on the mounting portion.

3. The magnetic head assembly of claim 1, wherein said carriage is made of metal.

* * * * *

UNITED STATES PATENT AND TRADEMARK OFFICE
CERTIFICATE OF CORRECTION

PATENT NO. : 4,796,118
DATED : January 3, 1989
INVENTOR(S) : Ohkita et al.

It is certified that error appears in the above-identified patent and that said Letters Patent is hereby corrected as shown below:

Col. 4, line 52, between "one" and "of" insert --end--.

Signed and Sealed this

Thirty-first Day of October, 1989

Attest:

DONALD J. QUIGG

*Attesting Officer*  *Commissioner of Patents and Trademarks*